June 2, 1970 G. S. LAING 3,515,816

HOUSING FOR A TELEPHONE INSTRUMENT AND GROMMET FOR USE THEREWITH

Filed April 23, 1968 2 Sheets-Sheet 1

June 2, 1970 G. S. LAING 3,515,816

HOUSING FOR A TELEPHONE INSTRUMENT AND GROMMET FOR USE THEREWITH

Filed April 23, 1968 2 Sheets-Sheet 2

United States Patent Office 3,515,816
Patented June 2, 1970

3,515,816

HOUSING FOR A TELEPHONE INSTRUMENT AND GROMMET FOR USE THEREWITH

Graham S. Laing, London, Ontario, Canada, assignor to Northern Electric Company Limited, Montreal, Quebec, Canada Filed Apr. 23, 1968, Ser. No. 723,522
Int. Cl. H01b *17/26;* H04m *1/15*
U.S. Cl. 179—100 12 Claims

ABSTRACT OF THE DISCLOSURE

A base plate of the telephone housing is provided at its front wall with an opening receiving a grommet through which a cable from the handset extends into the interior of the housing. A hole situated laterally adjacent this opening allows a station wire to enter the housing at the same end of the instrument. The grommet has two lateral flange portions overlying the outer surface of the front wall of the base plate, with a first one of these flange portions extending a greater distance with respect to the opening than the other one. The grommet is capable of two orientations: in one orientation, a first flange portion covers the hole, for use when the station wire enters the housing at its rear (e.g. when used as a table instrument); while in the other orientation the other flange portion terminates short of the hole so as to leave it free for the station wire to enter when the instrument is mounted on a wall.

This invention relates to improvements in the housing structure of a telephone instrument, that is to say to the structure itself and the particular arrangement and location of the surfaces and parts thereof that enable the instrument to perform certain useful functions and to be used in certain advantageous ways, without specific regard to the details of the electrical equipment that the structure will be called upon to house, such electrical equipment being assumed to be conventional or, in any case, not to be germane to the present inventive advances.

More specifically, this invention relates to a housing structure for a telephone instrument of the type including a base, a handset, a cable connecting the handset to the base, and a grommet embracing the cable at that location where the cable enters the housing.

The invention refers specifically to a housing for a telephone instrument which with a minimum of modification can be used either in a horizontal orientation as a table instrument or in a vertical orientation as a wall instrument. The station wire required for connecting the instrument to the telephone network will usually be arranged to enter the base at the rear (or upper) end of the instrument when used on a table, or alternatively, at the bottom (or front) end of the instrument when mounted on a wall. To achieve these different connections of the station wire, two holes have to be provided, one in the front and one in the rear end wall of the base. Since only one of these holes is used in any given installation, the other is left open, which is particularly undesirable in the table version of the instrument, because under these conditions the open hole will be in the front wall and directly visible to the user.

To avoid this, it is conceivable to manufacture the base of the housing without the hole for the station wire in the front wall and to have such hole cut in it at the time the instrument is installed on a wall. This design, however, has the disadvantage that a special tool and a special procedure is required for the wall installation of the instrument.

The improvement of the present invention provides a housing structure, in which the hole for the station wire is arranged laterally adjacent an opening receiving a portion of the cable from the handset, and it also provides a grommet having an internal channel, which embraces the cable portion, and comprising a body portion having side surfaces for snug engagement with the opening in either of two orientations of the grommet, flange portions connected to the body portion and each projecting laterally beyond the respective side surface to overlie an outer surface of the wall in each orientation of the grommet, whereby a first one of these flange portions projects laterally beyond the corresponding side surface further than the lateral projection of the other flange portion beyond the other side surface, so that in the orientation of the grommet in which the first flange portion extends towards said hole, which orientation will be adopted in the table use of the telephone instrument, the first flange portion covers the hole, whereas in the orientation of the grommet in which the other flange portion extends towards the hole, which orientation will normally be adopted in the wall installation, this other flange portion terminates short of the hole.

Preferably the instrument will be assembled with the first flange portion covering the hole. When it is to be installed as a table instrument, the station wire will be attached to a rear wall of the base. On the other hand, if the instrument is to be installed on a wall, the grommet has only to be turned through 180° to uncover the hole to allow the station wire to be inserted therethrough.

In a preferred embodiment of this invention, the flange portions project laterally by the same distance with respect to the channel in which the cord lies. Thus, the grommet will appear symmetrical in relation to the cord from the outside.

The grommet itself is also included within the scope of the invention.

Further features of the present invention will appear from the following specific description which is provided by way of example only.

Figure 1:
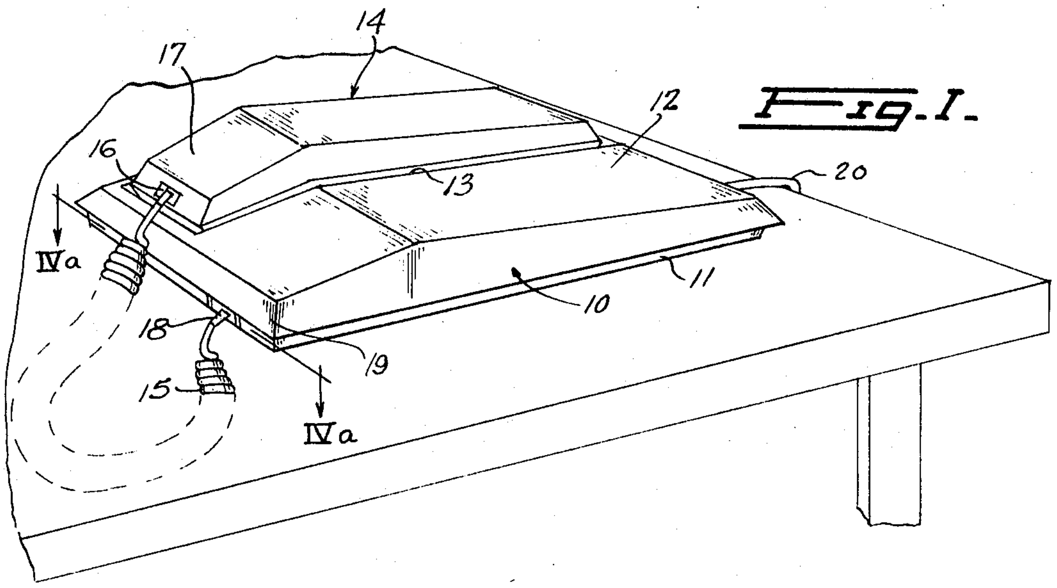
FIG. 1 is a perspective view of a telephone instrument shown in use as a table instrument, that is, in a horizontal orientation.
Figures 2, 3:
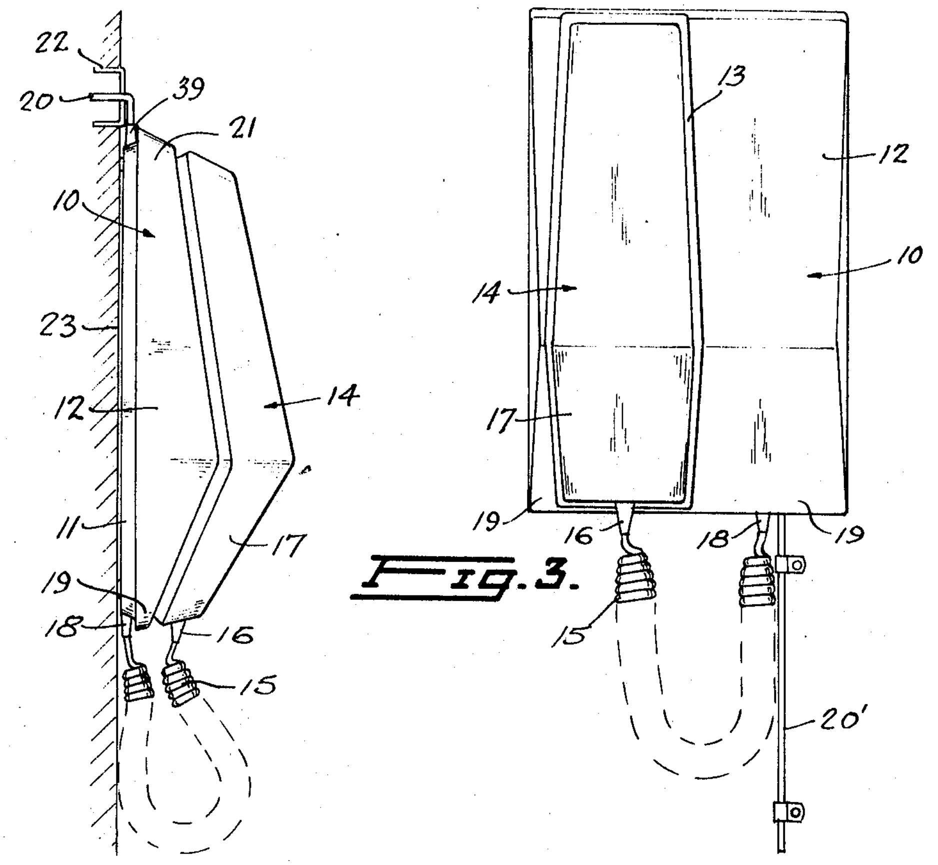
FIG. 2 is a side elevation, showing the instrument of FIG. 1 in use as a wall instrument, i.e. in a vertical orientation.
FIG. 3 is a front elevation, again showing the instrument in use as a wall instrument, but with a differently arranged connection.
Figures 4A, 4B, 4C, 5A, 5B, 6:
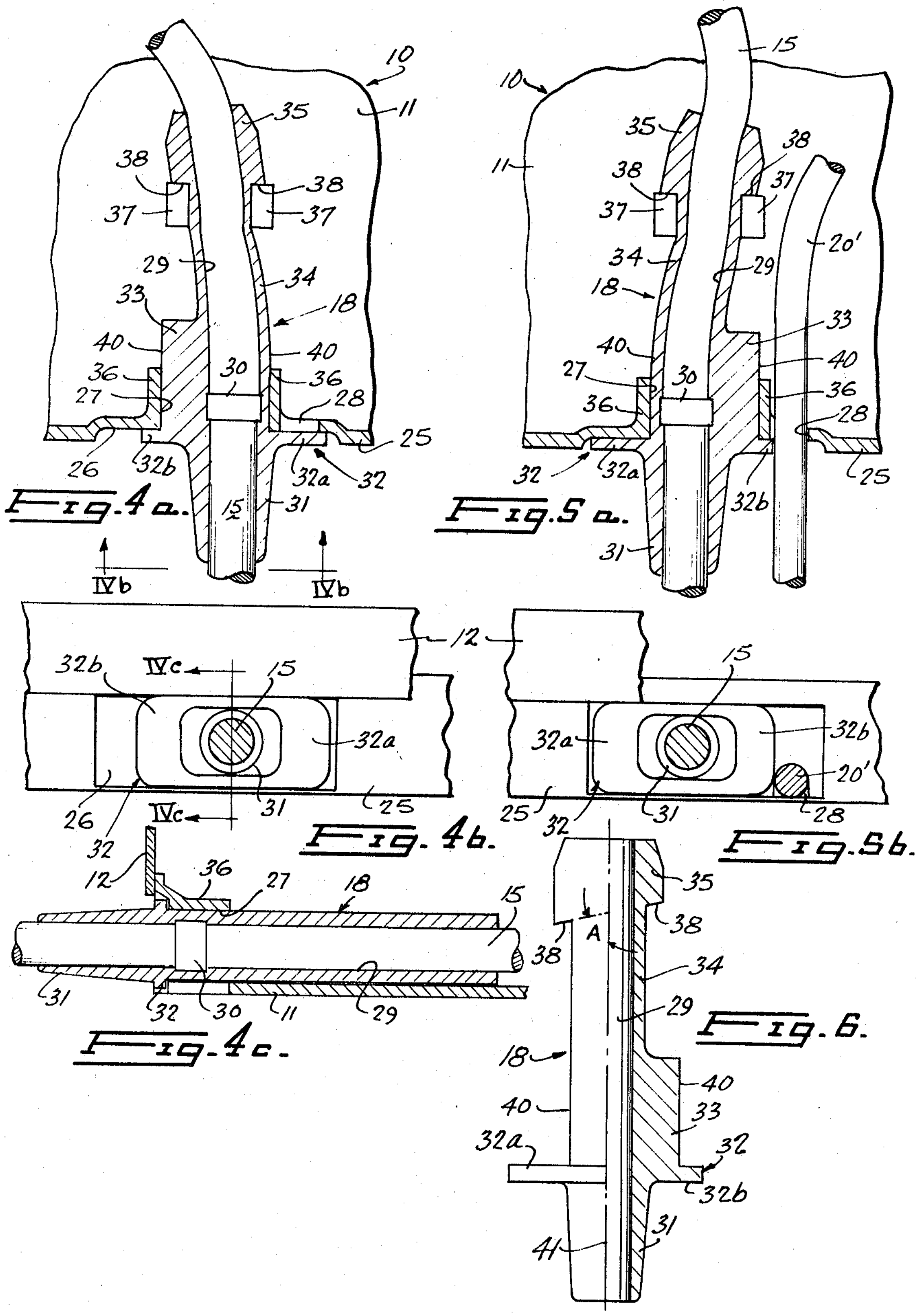

FIG. 4*a* shows, on an enlarged scale, a detail of the telephone instrument when in use as shown in FIG. 1 or FIG. 2, and consists of a cross section taken on the line IV*a*—IV*a* in FIG. 1;

FIG. 4*b* is a section taken on the line IV*b*—IV*b* in FIG. 4*a*;

FIG. 4*c* is a section taken on the line IV*c*—IV*c* in FIG. 4*b*;

FIGS. 5*a* and *b* consist of two views similar to FIGS. 4*a* and *b*, but showing this part of the telephone instrument when in use according to FIG. 3; and FIG. 6 shows a plan view of a grommet which forms part of the assembly shown in the other figures.

Referring to FIGS. 1 to 3 a base 10 of the telephone instrument includes a base plate 11 and a casing 12 defining a socket 13 for receiving an elongated handset 14. A flexible and conventional cable in the form of a helically wound cord 15 connects the handset 14 to the base 10. One end of the cord 15 is provided with a grommet 16 at the point where it enters the end wall of the transmitter portion 17 of the handset 14. At its other end, the cord 15 passes through another grommet 18 located in the base plate 11, at the same end thereof as the grommet 16, when the handset 14 is in its normal rest position in the socket 13. This general configuration of base and handset is disclosed in J. F. Tyson Canadian patent application Ser. No. 974,468 filed Oct. 31, 1966 (U.S. application No. 627,372 filed Mar. 31, 1967).

When the telephone is used as a table instrument, as shown in FIG. 1, a station wire 20 connecting the instrument to the telephone network will normally enter the base 10 at the rear end 21 thereof that is opposite to the front end 19. If the instrument is to be installed as a wall instrument as shown in FIG. 2, the station wire 20 may still enter the base 10 at the end 21, which has now become the upper end of the instrument. This arrangement will be used particularly in those cases where installation means such as a connector box 22 is provided in the wall 23 at a location above that of the instrument. In most cases, however, no such installation means will be provided, and, therefore, the station wire 20′ will usually come up from the base board to enter the base 10 on its end 19 which is now the lower end of the instrument, as shown in FIG. 3.

The enlarged views of FIGS. 4*a*, *b* and *c* and 5*a* and *b* show a portion of an end wall 25 of the base plate 11 at the end 19, such end wall 25 being provided with a recessed portion 26 in which there is provided an opening 27 for receiving the grommet 18, and a hole 28 through which the station wire 20′ may be passed into the interior of the base 10 (FIG. 5*a*). The grommet 18 consists of flexible material such as rubber, and is provided with a longitudinally extending, closed channel 29 for receiving the cord 15. To prevent longitudinal displacement of the cord 15 relative to the grommet 18, a band 30 is crimped onto a portion of the cord 15 within the channel 29.

The grommet 18 includes a slightly conical outer sleeve 31, a flange 32 of rectangular cross section comprising flange portions **32*a* and 32*b*, a body portion 33 also of rectangular cross section, a tubular neck 34 and an enlarged head 35. The conical sleeve 31, the flange 32, the neck 34 and the head 35 are symmetrically disposed with respect to the longitudinal axis of the channel 29, whereas the body portion 33** is asymmetrically arranged with respect to such axis, so that its main portion extends to the left in FIG. 4*a*, or to the right in FIG. 5*a* depending upon the orientation of the grommet 18. It will be appreciated that FIG. 5*a* shows the grommet 18 in an orientation rotated 180° about the axis of the cord 15 in relation to the alternative orientation of FIG. 4*a*.

The opening 27 is provided with an inwardly extending collar 36 for snugly engaging side surfaces 40 of the body portion 33 of the grommet 18. The neck 34 has a substantially smaller width than the body portion 33 and fits between retaining means in the form of a pair of posts 37 projecting from the base plate 11 spaced inwardly from the collar 36. The centre line of the space defined between the posts 37 coincides with that of the opening 27. Due to the asymmetry of the body portion 33 of the grommet 18, the neck 34 is bent to the left in FIG. 4*a*, or to the right in FIG. 5*a*. To avoid excessive tension in the outer side of the curved sleeve 34, in the unstressed condition of the grommet (as seen in FIG. 6), retaining faces 38 of the head portion 35 that engage the posts 37 form an angle A of about 80° with the longitudinal axis 41 of the channel 29, such angle A being formed on the side of the axis 41 opposite to that from which the body portion 33 extends the further.

Due to the asymmetry of the side surface 40 of the body portion 33 relative to the flange 32, the flange portion **32*a* covers the hole 28** in the orientation of FIGS. 4*a* and *b*, while the hole 28 is left uncovered by the shorter flange portion **32*b*** in the orientation of FIGS. 5*a* and *b* to allow the station wire 20′ to extend through it.

I claim:

1. A grommet having an internal channel for embracing a cable, said grommet comprising (a) a body portion having side surfaces for snug engagement with means defining an opening in a wall structure in either of two orientations of the grommet, and (b) flange portions connected to said body portion and each projecting laterally beyond a corresponding said side surface to overlie an outer surface of said wall structure in each of said orientations, (c) one of said flange portions projecting laterally beyond the corresponding side surface further than the lateral projection of the other said flange portion beyond the other side surface whereby said flange portions overlie different sections of said outer surface in the respective said orientations.

2. A grommet as in claim 1, wherein said flange portions project laterally by the same distance with respect to said channel.

3. A grommet as in claim 2, further comprising (d) a sleeve extending outwardly from said flange portions for enveloping said cable;

(e) a flexible neck portion extending inwardly from said body portion, said neck portion having a smaller lateral width than said body portion; and (f) an enlarged head portion extending inwardly from said neck portion, said head portion having at least one retaining surface facing towards said body portion.

4. A grommet as in claim 3, wherein said head portion has two retaining surfaces together forming a plane inclined with respect to the longitudinal axis of said channel at an angle smaller than 90°, said angle being formed on the same side of said axis to which said one flange portion extends.

5. In combination:

(a) a wall structure including means defining an opening therethrough and surface means at said opening for receiving a grommet, (b) a grommet having a body portion defining side surfaces engaging said surface means to retain the grommet snugly in said opening in either of two orientations, (c) a cable extending through said grommet whereby to traverse said wall structure, (d) said grommet further having flange portions connected to said body portion and each projecting laterally beyond a corresponding said side surface to overlie an outer surface of said wall structure in each of said orientations, (e) said wall structure including means defining a hole therethrough located laterally adjacent said opening, (f) a first one of said flange portions projecting laterally beyond the corresponding side surface further than the lateral projection of the other said flange portion beyond the other side surface, whereby in the orientation in which said first flange portion extends towards said hole it covers said hole, whereas in the orientation in which said other flange portion extends towards said hole it terminates short of said hole.

6. A combination as in claim 5, wherein said flange portions project laterally by the same distance from said cable.

7. A combination as in claim 5 wherein said wall structure is a base of the housing for a telephone instrument, said cable being provided for connection of a handset to said instrument and said hole being provided for receiving a portion of a station wire extending into the interior of said base.

8. In a housing structure for a telephone instrument comprising a base, a handset and a cable connecting said handset to said base:

(a) means defining an opening in a wall of said base for receiving a portion of said cable extending into the interior of said base;

(b) means defining a hole laterally adjacent said opening for receiving a portion of a station wire extending into said base interior; and (c) a grommet having an internal channel embracing said cable portion, said grommet comprising (i) a body portion having side surfaces for snug engagement with said opening in either of two orientations of said grommet, and (ii) flange portions connected to said body portion and each projecting laterally beyond a respective said side surface to overlie an outer surface of said wall in each of said orientations, (iii) a first one of said flange portions projecting laterally beyond the corresponding side surface further than the lateral projection of the other flange portion beyond the other side surface whereby in the orientation in which said first flange portion extends towards said hole it covers said hole, whereas in the orientation in which said other flange portion extends towards said hole it terminates short of said hole.

9. A structure as in claim 8, wherein said first and other flange portions project laterally by the same distance with respect to said channel.

10. A structure as in claim 9, wherein said base comprises retaining means and wherein said grommet is flexible and comprises an enlarged head portion at its inner end, said head portion having a retaining face engaging said retaining means to prevent outward displacement of said grommet relative to said opening.

11. A structure as in claim 8, further including a band crimped onto said cable portion for preventing relative movement of said cable in said channel.

12. In a housing structure for a telephone instrument comprising a base, a handset and a cable connecting said handset to said base:

(a) means defining an opening in a wall of said base for receiving a portion of said cable extending into the interior of said base, said means including a collar surrounding said opening and extending inwardly therefrom;

(b) means defining a hole laterally adjacent said opening for receiving a portion of a station wire extending into said base interior;

(c) retaining means mounted in said base behind said opening, said retaining means including two posts spaced apart in a direction substantially parallel to said wall; and (d) a grommet embracing said cord portion, said grommet including (i) a body portion having side surfaces for snug engagement with said collar in either of two orientations of said grommet, (ii) a flange connected to said body portion and having portions each projecting laterally beyond a respective said side surface by the same amount with respect to the axis of said cord, said flange portions overlying an outer surface of said wall in each of said orientations, (iii) a first one of said flange portions projecting laterally beyond the corresponding side surface further than the lateral projections of the other flange portion beyond the other side surface whereby in the orientation in which said first flange portion extends towards said hole it covers said hole, whereas in the orientation in which said other flange portion extends towards said hole it terminates short of said hole, (iv) an outer sleeve extending outwardly from said flange, said sleeve enveloping said cord, (v) a neck portion extending inwardly from said body portion, said neck portion being received between said posts, and (vi) an enlarged head portion extending inwardly from said neck portion, said head portion having two retaining surfaces together forming a plane inclined with respect to said axis at an angle smaller than 90°, said angle being formed on the same side of said axis to which said first flange portion extends.

References Cited

UNITED STATES PATENTS 3,315,040 4/1967 Brorein ............ 179—100

KATHLEEN H. CLAFFY, Primary Examiner

R. P. MYERS, Assistant Examiner

U.S. Cl. X.R.

174—65, 153; 179—178